Jan. 29, 1952     R. B. PENNELL ET AL     2,584,093
METHOD OF PURIFYING DIPHTHERIA TOXOIDS
Filed July 7, 1949     2 SHEETS—SHEET 1

Fig. 1

Crude Diphtheria Toxoid
|
Adjust to about pH 7.8 and ionic strength about 0.1
|
add 0.15 mgms. protamine sulfate per cc. toxoid
|
allow to stand at room temperature for about 12 hrs.
|
Sharples centrifuge
/ \
precipitate            supernatant
discard                 |
                        add two volumes distilled water
                        |
                        add glycine to make 0.3 molar
                        |
                        add trichloracetic acid to pH 3.5
                        |
                        allow to stand about 12 hours at 2°–5°C.
                        |
                        Sharples centrifuged
                        / \
          precipitate          supernatant
          collect               discard
          |
dissolve in 0.1 molar
sodium bicarbonate solution
|
dilute to desired Lf with
0.3 molar glycine
|
filter sterilely through Seitz
pad or candle filter INVENTORS.
ROBERT R. PENNELL
BY PETER MASUCCI
Raymond Underwood
ATTORNEY Jan. 29, 1952    R. B. PENNELL ET AL    2,584,093
METHOD OF PURIFYING DIPHTHERIA TOXOIDS
Filed July 7, 1949    2 SHEETS—SHEET 2

Fig. 2

Crude Diphtheria Toxoid
|
Adjust to about pH 7.8 and ionic strength about 0.1
|
add 0.15 mgms. protamine sulfate per cc. of toxiod
|
allow to stand at room temperature for about 12 hours.
|
Sharples centrifuge
╱    ╲
precipitate    supernatant
discard    |
add glycine to make 0.3 molar
|
add NaCl to ionic strength 0.8
|
add acetate buffer at pH 3.5 (2 cc. molar Na acetate and 12 cc. glacial acetic acid per liter of toxoid)
|
cool to 2°C. and add ethyl alcohol precooled to −50°C. to a concentration of 40% — the temperature of mixture kept at −5°C.
|
allow to stand about 12 hours at −5°C.
|
Sharples centrifuged
╱    ╲
precipitate    supernatant
|    discarded
dissolve in 0.1 molar sodium bicarbonate solution
|
dilute to desired Lf with 0.3 molar glycine
|
filter sterilely through Seitz pad or candle filter INVENTORS.
ROBERT R. PENNELL
BY PETER MASUCCI
Raymond Underwood
ATTORNEY Patented Jan. 29, 1952

2,584,093

UNITED STATES PATENT OFFICE 2,584,093

METHOD OF PURIFYING DIPHTHERIA TOXOIDS

Robert B. Pennell, Lansdowne, and Peter Masucci, Norwood, Pa., assignors to Sharp & Dohme, Incorporated, Philadelphia, Pa., a corporation of Maryland Application July 7, 1949, Serial No. 103,537

4 Claims. (Cl. 167—78)

This invention relates to a therapeutic preparation of a purified diphtheria toxoid applicable to produce immunization against diphtheria. The problem of producing a purified diphtheria toxoid is of great importance because toxoid is used on a large scale in the immunization of humans against diphtheria.

The active antigenic substance in crude or fluid diphtheria toxoid as usually prepared and marketed is very small. About 99 per cent or more of the total nitrogenous constituents present are non-specific and less than 1.0 per cent represent the specific toxoid protein which is the active antigen responsible for eliciting the protective antibody (antitoxin) when injected into humans.

The injection of crude diphtheria toxoid into humans may produce local and/or systemic reactions. These reactions are believed to be of the allergic type. The sensitizing substances present in crude toxoid fall into three general classes:

(1) Nitrogeneous substances such as albumoses and proteoses or other protein derivatives present in the culture medium used for growing the diphtheria bacillus; (2) bacillary protein derived by autolysis of the diphtheria bacillus during the growth of the organism and present in the culture filtrate; and (3) the active antigenic toxoid protein itself.

Many purification methods have been proposed having for their objective the removal from crude toxoid of the major portion of the non-specific nitrogenous substances present, for example, those contributed by the culture medium and those contributed by the autolysis of the diphtheria bacillus. By and large these methods may be grouped into two classes: (1) those which give a moderate degree of purification and high yields and (2) those which give a high degree of purification and relatively lower yields.

The methods which give a moderate degree of purification and high yields and which have been reported in the literature include precipitation with ammonium sulfate, precipitation with methyl alcohol, ethyl alcohol or acetone at icebox temperatures, precipitation with sodium and potassium alum and elution of the precipitate with disodium phosphate, and precipitation with ferric chloride.

The methods which give a high degree of purification and relatively lower yields include precipitation with acids, e. g., acetic, trichloracetic, hydrochloric, precipitation with combined acid and alcohol, adsorption with aluminum hydroxide and elution, precipitation with heavy metals and elution and precipitation with methyl alcohol at definite pH, ionic strength and temperature.

The methods, which use precipitants that give high yields and moderate purification, produce products that still retain all or essentially all of the bacterial protein originally present in the crude toxoid. The protein precipitants used are not selective from the standpoint of separating the bacterial protein from the toxoid protein. Since the bacterial protein is one of the substances present in crude toxoid which produces reactions in humans, purified toxoids produced by these methods fall short of the desired goal.

The purification of toxoid by isoelectric precipitation by means of acetic acid or hydrochloric acid is not new. Watson and Wallace (J. Path. Bact. 27:289, 1924) and Leonard and Holm (Jr. Inf. Dis. 53:376, 1933) used this procedure. These methods which use acids, e. g., precipitation at the isoelectric point, produce products which also retain most of the bacterial protein and porphyrin. Moreover, products produced by these methods flocculate with diphtheria antitoxin much more slowly; flocculation is greatly retarded. This prolonged flocculation time is believed by some investigators to denote some degree of denaturation of the toxoid protein with consequent impairment of its antigenic properties. (Schmidt and Kjaer: Biochem, Ztschr. 228:291, 1930; Kjaer: Compt. Rend. Soc. Biol. 110:1118, 1932; Pillemer, Toll and Badger: Jr. Biol. Chem. 170:571, 1940; Pillemer, Wittler, Clapp and Adams: Jr. Immunol. 58:223, 1948; Leonard and Holm: Jr. Inf. Dis. 53:376, 1933.)

The methods which make use of adsorbents and subsequent elution give low yields, are costly and not commercially practical.

Pillemer recently reported, Pillemer, Wittler, Clapp and Adam: Jour. Immunol. 58:223 (March 1948), on a method which includes the use of methyl alcohol under controlled conditions of pH, ionic strength and temperature. Pillemer used this method to purify diphtheria toxoid which had been produced on deferrated semi-synthetic medium. This medium differs markedly from the natural media used by commercial laboratories by the fact that it contains no proteoses, peptones or other protein derivatives other than amino acids. The conditions of purification which Pillemer found applicable to the purification of diphtheria toxoid produced on semisynthetic medium are not the same as those found applicable to diphtheria toxoid produced on peptone media. Pillemer's procedure includes six steps and while the end product is relatively pure, the procedure is too involved and costly for practical application.

Ross (American Journal of Diseases of Children—Sept. 1944, vol. 68, pp. 172–181, Victor Ross, "Preparation and Immunizing Properties of Protamine Diphtheria Toxoids") prepared diphtheria toxoid protamine precipitated from crude toxoid and describes a procedure whereby he adds to the crude toxoid a small amount of protamine sulfate to precipitate the bacterial protein and later dilutes with three volumes of distilled water and adds a larger amount of protamine sulfate to precipitate the toxoid protein. This procedure produces an end product which is an improvement as to purity over the present alum precipitated toxoid but still contains relatively large amounts of nitrogenous substances derived from the culture medium. Ross was primarily interested in producing a protamine precipitated toxoid and not a fluid purified toxoid as will be described in this invention.

The present invention relates to methods for obtaining purified and antigenically potent diphtheria toxoid that are practical and economically feasible.

The product of the invention is obtained by a new combination of steps which may in general be described as, first, the removal of the bacterial protein from crude diphtheria toxoid by protamine, and second, the precipitation of the toxoid at pH 3.0 to 4.5 by known reagents. As an important feature of this invention, this second step is most advantageously carried out in the presence of glycine.

We have found that crude toxoid prepared on peptone medium contains appreciable amounts of bacterial protein derived from the diphtheria bacillus. We have also found that at least 90 per cent of this bacterial protein may be removed from the crude toxoid by adding to said toxoid a suitable amount of a protamine salt such as protamine sulfate. We have also found that protamine reacts not only with the bacterial protein to form a precipitate but also reacts with the porphyrin and nucleic acids to form a precipitate. Thus the addition of protamine to crude toxoid in suitable quantities and under the proper conditions, as contemplated by the first step referred to above, is an important purification step because it enables us to remove from the crude toxoid at least 90 per cent of the bacterial protein and a major portion of the porphyrin and nucleoproteins present in the crude toxoid.

Precipitation of proteins by protamines, of course, is a well known phenomena that has been studied by several investigators. It is generally accepted to be the result of a salt-like combination occurring between oppositely charged substances. In the presence of certain ionic concentrations and pH this combination does not take place, or if it does, no visible precipitation occurs. As a part of this invention, the protamine is added to the diphtheria toxoid at a certain ionic strength and pH so that the protamine selectively combines and forms a precipitate with essentially all of the bacterial protein present in the toxoid and a major portion of the porphyrin, only a very small portion of the desired toxoid protein being precipitated.

In carrying out this treatment with protamine, satisfactory results are obtained if the ionic strength is .03 to .25 but it can be even higher, although this is undesirable because considerable subsequent dilution will be necessary. Preferably the ionic strength is adjusted to .03 to .15 and for best results it is .1. The pH should be adjusted to 7.0 to 8.3 and preferably is about 7.8.

The amount of protamine sulfate which must be added to the crude toxoid to remove at least 90 per cent of the bacterial protein varies from batch to batch of toxoid but in general we have found that 0.05 to 0.30 mgm. per cc. of crude toxoid are sufficient to achieve the desired objective, .15 mgm. being preferred.

The mixture is allowed to stand at room temperature but it may be somewhat higher or lower. The length of time that the reactive mixture should stand before separation will also vary from batch to batch, but in general 2 to 72 hours' standing gives satisfactory results, about 12 hours being preferred.

The precipitate is separated from the liquid by any suitable procedure. This is probably most conveniently done by centrifugation, the precipitate being discarded.

Considering now the second step referred to above, it can be carried out according to known procedures. However, it is most advantageously carried out in the presence of glycine, as we have found that if we add to the toxoid from the first step a suitable amount of glycine previous to the addition of acid to precipitate the toxoid at its isoelectric point, the product resulting by this procedure has a Kf much shorter than when the precipitation is carried out without the presence of glycine. As previously mentioned above, the known procedures which use acids to precipitate diphtheria toxoid have given products which not only contained bacterial protein and some porphyrins, but also products which had a very prolonged Kf or flocculation time. This long Kf is undesirable and has been asserted to indicate impairment of anti-genic properties.

Glycine has been used previously in immune serum globulin (human) and in purified toxoids as a stabilizing agent (Pillemer, supra). The glycine is there added to the finished purified product. The addition of glycine to a crude toxoid to stabilize the active antigenic component prior to treatment with acid is to our knowledge a novel and valuable step. The presence of the glycine protects in some manner the toxoid protein from the deleterious action of low pH brought about by the use of acids, acid and organic solvent or acid buffers and organic solvent.

Before the glycine and precipitating agent are added, the centrifugate from Step 1 should be diluted in order to reduce the ionic strength. To do this an equal volume of water or as much as three times water as centrifugate may be added, about two volumes of water being preferred. The glycine should be added and mixed into the solution before the precipitating agent is added.

The precipitation in the presence of glycine may be carried out at a pH range of 3.0 to 4.5 and preferably at 3.5. The acid employed is not limited to trichloracetic, as other commonly used acids for this purpose, such as acetic, hydrochloric, or acid buffers such as sodium acetate and acetic acid may be used to adjust the pH. We have found that while 0.3 M glycine is preferable, concentrations as low as 0.05 molar and concentrations as high as 0.5 M may be used satisfactorily. The mixture should stand under ice-box temperature and this is preferably 2–5° C.

The precipitation of the toxoid protein in the presence of glycine in the concentration and under the conditions set forth, may also be carried out in the additional presence of 25 to 50 per cent ethanol or methanol under refrigerated conditions. It is preferable that this be at —5 to 0° C.

These mixtures should stand for a period of 4 to 16 hours, 5 hours being preferred, and that the precipitate be then separated from the liquid. The precipitate is then dissolved in any suitable aqueous solvent which can be used thereafter either as a fluid toxoid or from which a precipitate may be made for use such as an alum precipitated toxoid or a protamine precipitated toxoid.

We have found that by this new combination of steps we can produce a product which is essentially free of bacterial protein, is reasonably pure, is antigenic, and can be produced economically. Moreover, the separate steps which are a feature of this invention can be carried out in conjunction with other known steps to obtain improved results.

Representative embodiments of the invention are illustrated in the drawings, in which: and Figure 1 is a flow diagram of one procedure;
Figure 2 is a flow diagram of another procedure.
The invention will be illustrated by the following examples:

EXAMPLE 1

*Step 1. Removal of bacterial protein porphyrin and nucleoproteins*

To 16 liters of crude diphtheria toxoid produced on a hog stomach digest medium, containing 1:10,000 merthiolate, was added 400 cc. of a 0.6% aqueous solution of protamine sulfate or 0.15 mg. per cc. to toxoid. The solution became turbid and was allowed to stand at room temperature for about three days. The precipitate which formed was removed by passing the mixture through a Sharples centrifuge at about 25,000 R. P. M. 'S. The centrifugate was clear and was retained. The precipitate which collected in the centrifuge bowl was discarded. This contained nearly all of the bacterial protein and a major portion of the iron containing porphyrin and of nucleoproteins originally present in the crude toxoid.

The original crude toxoid contained 42 Lf units per cc. The toxoid after the protamine treatment contained 38 Lf per cc., thus, the loss of activity as measured in Lf units was about 10 per cent. It was estimated that the protamine treated toxoid had less than 5 per cent of the bacterial protein present in the original crude toxoid.

*Step 2. Precipitation of toxoid protein*

To 10 liters of diphtheria toxoid which had been treated with protamine sulfate as described above was added two volumes of distilled water and enough glycine to make the final concentration 0.3 M. The ionic strength was calculated to be about 0.03. Sufficient trichloracetic acid was then added to make the pH of the material about 3.5. The material was allowed to stand at icebox temperatures overnight and then passed through a Sharples centrifuge. The precipitate was collected in the bowl and retained; the centrifugate was discarded. The precipitate was washed once with physiological saline at pH 3.5 and then dissolved in a suitable diluent such as sodium bicarbonate solution. Results: Yield expressed as Lf's—85 per cent; purity expressed as Lf's per mg. nitrogen—1590 (original crude untreated toxoid 15 Lf's per cc.); Kf, flocculation time in minutes—17.

To show the importance of the presence of the glycine, the same batch of crude toxoid without protamine treatment was treated in identically the same way except that precipitation of the toxoid protein at pH 3.5 was done without the presence of 0.3 M glycine. Results: Yield expressed in Lf units—58 per cent; purity expressed as Lf's per mg. nitrogen—1130; Kf in minutes—208.

It should be noted that when the precipitation is carried out in the presence of glycine the yield and purity are significantly higher and the Kf or flocculation time is very markedly reduced. In all cases, the Kf or flocculation time was done on toxoid diluted to the original volume of crude toxoid used in the purification procedure.

EXAMPLE II

This illustrates the precipitation of protamine treated diphtheria toxoid at pH 3.5 and 40 per cent ethanol in the presence of 0.3 M glycine.

Ten liters of diphtheria toxoid was treated with protamine sulfate and centrifuged as set forth in Example I. To the centrifugate was added enough glycine to make the final concentration 0.3 M, acetate buffer to make the pH 3.5 and 40 per cent cold ethanol. The ionic strength was calculated to be about 0.80. The material was allowed to stand overnight at —5° C. and then passed through a Sharples centrifuge. The precipitate was collected, the centrifugate discarded. The precipitate was washed once with physiological saline and then dissolved in a suitable diluent.

Results: Yield—76 per cent; purity—607 Lf's mg. nitrogen; Kf—32 minutes.

To carry out further purification, a portion of this partially purified toxoid containing 40 Lf units per cc. was diluted with two volumes of distilled water and divided into two parts: The first part (A) was precipitated at pH 3.5 (trichloracetic acid) without the previous addition of glycine and the second part (B) was precipitated at pH 3.5 (trichloracetic acid) in the presence of 0.3 M glycine. The precipitates were treated identically the same, washed once and dissolved in a suitable diluent. Results: Portion (A) yield—87 per cent; 3130 Lf's per mg. nitrogen: Kf—1008 minutes. Portion (B) yield—87 per cent; 1805 Lf's per mg. nitrogen; Kf 145 minutes. The Kf was determined in both cases on toxoid diluted to about 40 Lf's per cc.

It should be noted that portion (A) which was precipitated without the presence of glycine gave 3130 Lf's per mg. of nitrogen but had a very prolonged Kf of 1008 minutes. Most investigators believe that 100 per cent pure toxoid protein contains about 2200 Lf units per mg. nitrogen. We are unable to state with any degree of assurance the meaning of this abnormally high figure. The abnormally high purity figure and the very prolonged Kf or flocculation time may indicate that the toxoid protein has undergone some form of denaturation or perhaps depolymerization. Whatever the explanation, it is evident that when the same material is precipitated at pH 3.5 in the presence of 0.3 M. glycine, the Lf's per mg. nitrogen are 1800 and the Kf 145 minutes, both values being within normal limits. This to us indicates that glycine protects in some manner the toxoid protein from the deleterious action of the low pH to which it is subjected.

The purified diphtheria toxoid made according to the process herein described when diluted to 50 Lf units per cc. was found antigenic when tested according to the N. I. H. requirements. Ten guinea pigs injected with 0.5 cc. were challenged 42 days later with 10 m. l. d.'s of diphtheria toxin. All the animals survived.

The invention is not limited to the exact details in material and conditions described in the examples, since these are merely illustrative of the invention and may be varied considerably by anyone skilled in the art. Thus, the feature of the invention which comprises the step of adding glycine prior to adjusting the pH at which the toxoid protein precipitates out is not limited to toxoid previously treated with protamine but is applicable to untreated toxoid. Other crude toxoids derived from culture medium may be utilized in place of the one derived from hog stomach digest medium shown in the examples, for example, a semi-synthetic medium. Furthermore, the protamine salt may be of any strong acid such as the sulfate or chloride. Such salts may be prepared, as is understood in the art, from protamines derived from salmon sperm, sturgeon sperm, herring sperm, mackerel sperm, lumpsucker sperm, rainbow trout sperm, etc.

This application is a continuation in part of the co-pending application, Serial Number 53,768, filed on October 9, 1948, in our names now abandoned.

What we claim is:

1. The process of preparing purified diphtheria toxoid which comprises adding to crude diphtheria toxoid a protamine salt to a concentration of 0.05–0.30 mgm. per cc. of crude toxoid, adjusting the pH to 7.0–8.3 and the ionic strength to .03–.25, allowing the mixture to stand for 2–72 hours, removing and discarding the precipitate, adding glycine to the recovered liquid to 0.05–.5 M concentration, adjusting the pH to 3.0 to 4.5, allowing the mixture to stand for 4–16 hours under refrigerated temperature, recovering the precipitate, and dissolving the precipitate in a suitable solvent.

2. The process of preparing purified diphtheria toxoid which comprises adding to crude diphtheria toxoid a protamine salt to a concentration of 0.05–0.30 mgm. per cc. of crude toxoid, adjusting the pH to 7.0–8.3 and the ionic strength to .03–.25, allowing the mixture to stand for 2–72 hours, removing and discarding the precipitate, adding glycine to the recovered liquid to about 0.3 M concentration, adjusting the pH to 3.0–4.5, allowing the mixture to stand for about 5 hours under refrigerated temperature, recovering the precipitate, and dissolving the precipitate in a suitable solvent.

3. The process of preparing purified diphtheria toxoid which comprises adding to crude diphtheria toxoid a protamine salt to a concentration of about 0.15 mgm. per cc. of crude toxoid, adjusting the pH to about 7.8 and the ionic strength to about 0.10, allowing the mixture to stand for about 12 hours, removing and discarding the precipitate, adding glycine to the recovered liquid to about 0.3 M concentration, adjusting the pH to 3.0–4.5, allowing the mixture to stand for about 5 hours under refrigerated temperature, recovering the precipitate, and dissolving the precipitate in a suitable solvent.

4. The process of preparing purified diphtheria toxoid which comprises adding to crude diphtheria toxoid a protamine salt to a concentration of 0.05–0.30 mgm. per cc. of crude toxoid, adjusting the pH to 7.0–8.3 and the ionic strength to .03–.25, allowing the mixture to stand for 2–72 hours, removing and discarding the precipitate, adding glycine to the recovered liquid to 0.05–.5 M concentration, adjusting the pH to 3.0–4.5, adding an alcohol selected from the group consisting of methanol and ethanol to a 25–50% concentration by volume, allowing the mixture to stand for 4–16 hours under refrigerated temperature, recovering the precipitate, and dissolving the precipitate in a suitable solvent.

ROBERT B. PENNELL.
PETER MASUCCI.

REFERENCES CITED

The following references are of record in the file of this patent:

FOREIGN PATENTS

| Number | Country | Date |
| --- | --- | --- |
| 56,575 | Denmark | Aug. 21, 1939 |

OTHER REFERENCES

Pillemer in J. Immunology, vol. 58, Mar. 1948, pp. 223–228.

Pillemer in J. Biol. Chem., vol. 170, Oct. 1947, pp. 571–585.

Pillemer in J. of Immunology, vol. 54, Nov. 1946, pp. 213–224.

Ericsson in Nature, Sept. 7, 1946, pp. 350–351.